(No Model.) 2 Sheets—Sheet 1.
H. C. SPAULDING.
DYNAMOMETER.
No. 414,598. Patented Nov. 5, 1889.
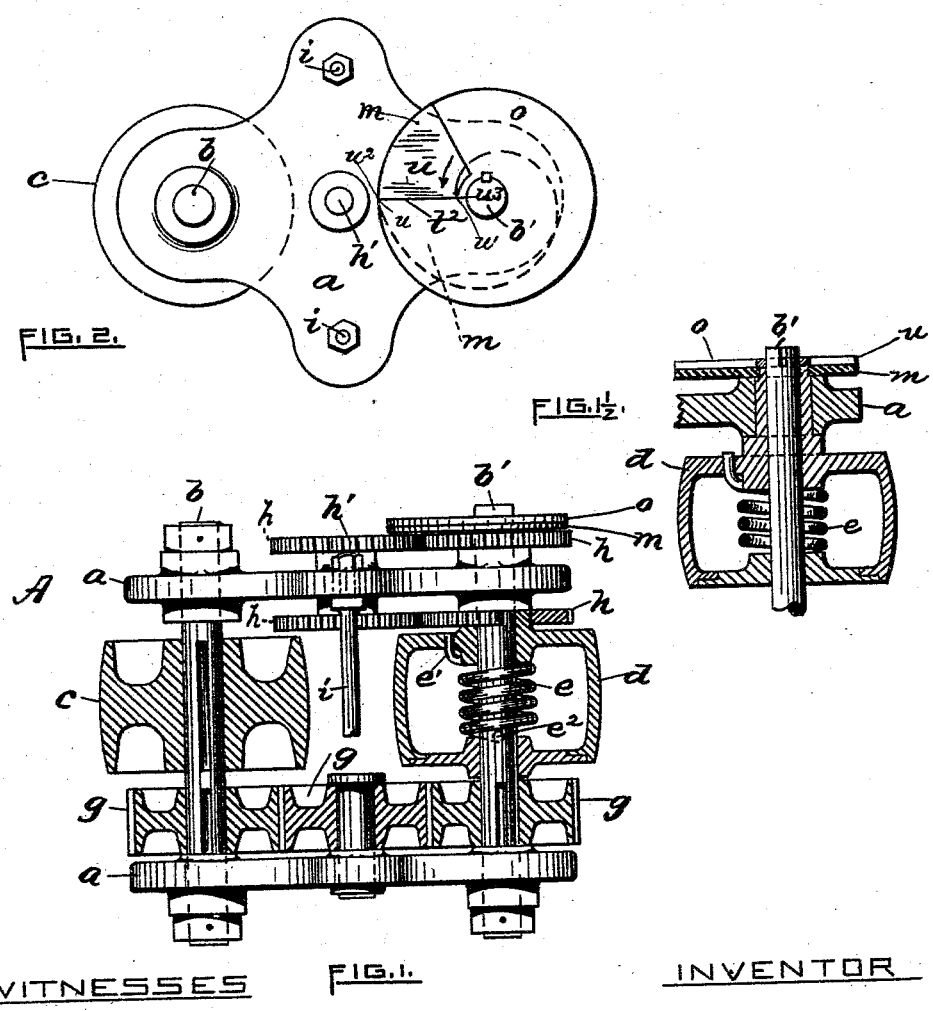
WITNESSES  FIG. 1.  INVENTOR

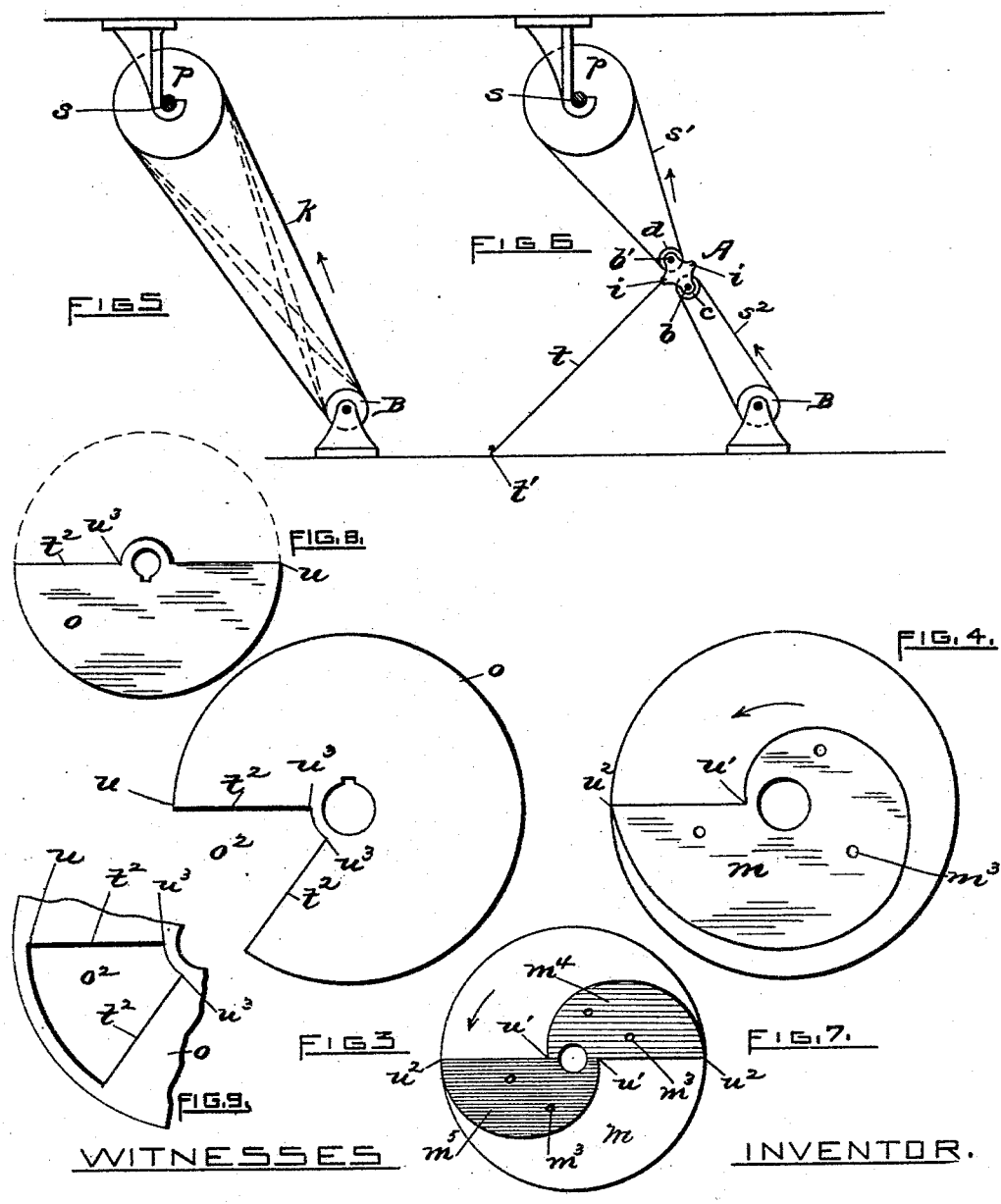

UNITED STATES PATENT OFFICE.

HOLLON C. SPAULDING, OF BOSTON, MASSACHUSETTS.

DYNAMOMETER.

SPECIFICATION forming part of Letters Patent No. 414,598, dated November 5, 1889.

Application filed April 16, 1889. Serial No. 307,433. (No model.)

*To all whom it may concern:*

Be it known that I, HOLLON C. SPAULDING, a citizen of the United States, residing at Boston, in the county of Suffolk and State of Massachusetts, have invented certain new and useful Improvements in Dynamometers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has for its object the production of a dynamometer or tension-measuring machine adapted to be readily applied and used for determining the power transmitted to any driven machinery.

To that end my invention consists, essentially, of a pair of interposed pulleys which, by means of belts, receive the power from the main driving-pulley and transmit it to the pulley forming a part of the machine to be driven. One of the said interposed pulleys is loosely mounted upon a shaft and is connected with a strong coiled spring, the other end of the spring being secured to the pulley-shaft. To the latter is secured a slotted disk, back of which is loosely mounted a colored cam-disk arranged to travel in unison with the pulley, all as will be more fully hereinafter set forth and claimed.

By means of my improved dynamometer it is possible to take a "reading" of the instrument at any time while in operation and while revolving at any velocity within its limits. The tension or "pull" upon the belt at any instant is indicated by the relation of the slot of the disk to the uncovered periphery of the cam at the same time, the operator simply having to take the distance in a pair of dividers or other analogous means lying between the center of the shaft and the exposed point in the cam's surface. This distance or reading (which indicates the torsional strain to which the spring is subjected at the time) is next referable to a scale previously graduated to the spring used, such scale usually indicating pounds. Now by knowing the velocity of the belt at the time of taking the record it is easy to determine the horse-power. Practically, however, certain coefficients or factors are employed, which serve to greatly lessen the labor of computations.

In a class of dynamometers heretofore in use, which depend upon a column of confined fluid to indicate the variations in pressure, it is practically impossible to obtain sufficiently accurate scale-readings under all conditions, owing to changes or fluctuations due to leakage of the fluid, thereby rendering such instruments inaccurate and unreliable.

In the appended two sheets of drawings illustrating my invention, Figure 1, Sheet 1, is a horizontal sectional view of the device as a whole. Fig. 1½ is a similar view showing a modified form of the loose pulley, &c. Fig. 2 is a side view with some of the parts removed. Fig. 3, Sheet 2, is a front view of the slotted disk adapted to be secured to the pulley-shaft. Fig. 4 is a front view of the cam-disk loosely mounted upon the pulley-shaft and adapted to revolve in complete unison with the pulley. Fig. 5 shows in reduced scale a pulley or machine driven from the main-line shaft. Fig. 6 is a similar view, the driving belt being removed, and showing the manner of applying and connecting my improved dynamometer as in use. Fig. 7 is a front view, in reduced scale, of the cam-disk having a double cam painted or otherwise indicated thereon; and Figs. 8 and 9 represent modified forms of the disk shown in Fig. 3.

A more detailed description of my improved dynamometer, including the manner of its operation, is as follows:

Referring again to the drawings, A indicates the apparatus as a whole.

$a$ $a$ designate the two side frames arranged to carry the several parts of the mechanism. The sides are connected transversely by collared tie-rods $i$, provided with end nuts adapted to be screwed firmly against the faces of the frame.

$b$ and $b'$ indicate two short pulley-shafts mounted to revolve in the frame $a$. To the first-named shaft $b$ is secured a pulley $c$, from which, by means of a belt $s^2$, the power is transmitted to the pulley B, which in turn drives any suitable machine, Fig. 6. Upon the other short shaft $b'$ a pulley $d$ is loosely mounted, which may be driven by a belt $s'$, leading from a driving-pulley $p$, secured to the main-line shaft $s$, Fig. 6. The pulley $d$, as drawn, is hollow, and is provided with a hub portion at each end, as shown in Fig. 1. Intermediate of said hubs and surrounding the shaft $b'$ is located a coiled spring $e$, having one end $e'$ secured to the pulley and the other end $e^2$ secured to the shaft $b'$. The power of the pulley $c$ is transmitted to the pulley $d$ by the gears $g$, or vice versa, as desired. The intermediate gear $g$ obviously causes the two pulleys $c$ $d$ to revolve in one direction, thereby obviating the employment of a crossed belt.

To one side of the hub of the loose pulley is secured a small gear $h$, which intergears with a gear $h$ of the same size, secured to a loose shaft $h'$, the latter having a similar gear $h$, secured to its opposite end, intergearing with a like gear $h$, loosely mounted upon the shaft $b'$. To the front of the last-mentioned gear is secured a cam-disk $m$. This arrangement causes the said gear and disk to revolve exactly in unison with the pulley $d$. It is obvious that the same result may be accomplished by omitting the gears and forming a sleeve upon the corresponding end, the sleeve extending through the frame-bearing and having the cam-disk $m$ secured to its outer end, as indicated by Fig. 1½; but such an arrangement materially increases the percentage of friction.

The disk $m$ (see Fig. 4) has a spiral or cam-shaped figure formed on its surface. The proper form may be best determined by making an actual test of the spring torsionally, the longest radius, terminating at $u^2$, indicating the greatest pressure, and the shortest radius, measured from the center to the point $u'$, being the line of no pressure or zero. I would state that practically I prefer to use a thin metal disk on which the cam proper is painted in some vivid color, the remaining surface of the disk being white or any color which forms a striking contrast with that of the cam, or vice versa. The disk, as drawn in Figs. 1, 2, 4, and 7, is loosely fitted to the shaft $b'$, and is adapted to revolve in exact unison with the pulley $d$ by means of screws or pins passing through holes $m^3$, formed in the disk and tapped into the contiguous loosely-mounted gear $h$.

In some cases I may provide the disk $m$ with two oppositely-arranged cams $m^4$ $m^5$, having dissimilar colors, as indicated by Fig. 7. By reason of the employment of a double cam the readings may be taken with greater exactness as compared with the single-cam disk of equal diameter, from the fact that for equal angular distances the net radius or offset of the latter will be but one-half that of the former. Immediately in front of the cam-disk is located a thin cover or exposing-disk $o$, (see Fig. 3,) which is rigidly secured to the shaft $b'$. This disk is cut away at one side, as at $o^2$, one or both sides of the opening forming radial lines $t^2$ $t^2$, the same being so arranged with relation to the cam-disk that the inner end $u^3$ of the radial side practically coincides with the zero-point $u'$ of the cam-disk when the pulley $d$ is in a state of rest and indicating no tension or pressure upon the belt. In Fig. 8 the cover $o$ has the form of a half-disk, which is more particularly adapted to be used in combination with the double cam shown in Fig. 7.

In order to cover or protect the outer ends $u$ of the sides $t^2$, the rim or periphery of the disk may be continued, as shown in Fig. 9. The face of the covers $o$ may be painted or polished, as desired.

The operation may be described as follows: Assuming that a machine having a driving-pulley B is to be tested to ascertain the power required to operate it, I first remove the driving-belt $k$, Fig. 5, and substitute my dynamometer A, the latter being connected with the main pulleys $p$ B by the two short belts $s'$ $s^2$, which respectively engage the dynamometer-pulleys $d$ $c$. The two side frames $a$ are secured together by braces $i$, to one of which a stay $t$ may be attached, the same extending to the floor, where it is secured, as at $t'$, Fig. 6. By this arrangement the stay serves to maintain the dynamometer in position when in use and also prevents lateral vibration. Now upon running the driving-belt $s'$, Fig. 6, in the arrow direction the pulley $d$ will be revolved in the same direction against the tension of the spring $e$, thereby revolving the shaft $b'$. The power is transmitted therefrom to the driving-pulley B of the machine to be tested by means of the gear-train $g$, pulley $c$, and belt $s^2$. The pulley B may be a clutch-pulley or otherwise adapted to be used for readily throwing the load on or off the machine, the parts now being out of clutch. Thus far the only power developed is that required to overcome the friction of the moving parts. At the same time the inner point $u'$ of the cam $m$ coincides very nearly with the inner end $u^3$ of the radial side $t^2$ of the disk or cover $o$, substantially as shown in Fig. 2. Now upon "clutching" the pulley B or otherwise throwing the load or work of the machine upon the belt $s^2$ it will be found that the strain upon the belt will cause the cover $o$ to change its angular position with relation to the cam $m$. As soon as the cam and cover become "steady," both now revolving practically in unison, the attendant, in order to take the reading or indication, next places, say, the point of one leg of a pair of dividers in the center of the shaft $b'$, at the same time opening them, and causes the point of the other leg to extend along the working edge or radial side $t^2$ of the cover-opening $o^2$ to the limit of color disclosed or exposed of the cam's outline. The distance thus found minus the distance from the center of the shaft to the inner end $u'$ of the cam is now transferred to a suitably-graduated scale to indicate the torsion of the spring $e$ in pounds, thereby determining the gross stress or tension upon the belt, which pressure multiplied by the velocity of the belt in feet per minute obviously gives the foot-pounds, which may be readily reduced to horse-power by dividing the product by thirty-three thousand.

In case the double-cam disk, Fig. 7, be used the manner of ascertaining the distance to be transferred to the scale is substantially the same as just described, except that the latter scale for equal lengths will indicate only about one-half the pressure of the former or single-cam arrangement. Consequently the errors in reading will be relatively reduced. This result may be stated as follows, assuming that one cam $m^4$, Fig. 7, of the disk $m$ be yellow and the other $m^5$ black, and that the cover $o$, Fig. 8, be mounted in front: Now when any portion of the yellow cam is visible (revolving, as indicated) the distance taken in the dividers will equal that measured from the center to the point at which the working side $t^2$ of the cover $o$ intercepts said color up to one-half a revolution of the cam or its radius, after which, as the black cam $m^5$ becomes exposed, the distance taken will always equal said radius plus the length from the center to the interception of the cam by the working-edge $t^2$.

The relation of the cam and cover may be transposed — that is, the cover $o$ may be mounted intermediate of the cam and gear $h$—and said cover and cam (one or both) may be made of glass or other suitable transparent material, if desired.

The relation of the dynamometer to the machine-pulley B, as represented in Fig. 6, may be reversed by inverting the dynamometer, in which case the pulley $d$ would receive the belt $s^2$ and operate the pulley B.

In the event of a crossed belt being used, as indicated by dotted lines in Fig. 5, the dynamometer need have but two intergearing gears $g$ of larger diameter, the intermediate gear being omitted.

I would state that the office of the stay $t$ (or stays, as two or more may be employed) is not solely to keep the dynamometer in position when in use, but it also serves to take up the slack of the belts by simply carrying the dynamometer to one side a sufficient distance.

I claim as my invention—

1. In a dynamometer, the combination of a pulley, a shaft on which the pulley is mounted, a spring connecting said pulley and shaft and having cam and cover disks connected therewith arranged to indicate angular changes in the relative position of said shaft and pulley in working, substantially as hereinbefore described.

2. A dynamometer of the class hereinbefore described, provided with a mounted shaft, a pulley mounted thereon, a spring connecting said shaft and pulley, and cam and cover disks connected therewith arranged and adapted to vibrate in opposite directions, substantially as described, and for the purpose set forth.

3. In a dynamometer, the combination, with a mounted driven shaft $b'$, of a pulley loosely mounted upon the shaft, a spring connecting the said pulley and shaft, a cam-disk arranged to revolve in exact unison with the pulley, and an outer or cam-exposing disk secured to the shaft, all constructed, arranged, and adapted for operation, whereby any change or variation of the pressure in working produces a relative angular change in the position of the two disks, substantially as hereinbefore set forth.

4. In a dynamometer, the combination of a driven shaft, a pulley $d$, mounted thereon, a spring connecting said shaft and pulley, a belt connected with the pulley, and a tension-indicating apparatus, substantially as hereinbefore described, whereby any change or variation in the tension of the belt produces a change in the relative angular positions of the said pulley and shaft, substantially as hereinbefore set forth.

5. In a dynamometer, the combination of a driven shaft, a pulley mounted thereon, a spring connecting said shaft and pulley, a colored cam-disk revolving in unison with the pulley, and a cam-exposing disk $o$, secured to said shaft, combined and arranged, whereby any change or variation in the tension of the belt produces a change in the relative angular positions of the two disks, substantially as hereinbefore set forth.

6. The combination, with driver and driven pulleys, of the interposed dynamometer A, hereinbefore described, consisting of the frame $a$, shafts $b$ $b'$, mounted to revolve therein, a pulley $c$, secured to the shaft $b$, a pulley $d$, loosely mounted upon the shaft $b'$, a spring $e$, connected with the pulley $d$ and its shaft, a colored cam-disk $m$, arranged to travel in unison with the pulley $d$, a cam-exposing disk $o$, secured to the shaft $b'$ in front of said disk $m$, and a stay $t$, adapted to maintain the apparatus in position when in use, substantially as shown and hereinbefore set forth.

In testimony whereof I have affixed my signature in presence of two witnesses.

HOLLON C. SPAULDING.

Witnesses:
 CHARLES HANNIGAN,
 GEO. H. REMINGTON.